United States Patent
Heise

(10) Patent No.: US 10,896,603 B2
(45) Date of Patent: Jan. 19, 2021

(54) SYSTEM AND METHOD FOR REDUCING DELAYS IN ROAD TRAFFIC

(71) Applicant: Graphmasters SA, Spiegel b. Bern (CH)

(72) Inventor: Sebastian Heise, Rahden (DE)

(73) Assignee: Graphmasters SA, Bern (CH)

( * ) Notice: Subject to any disclaimer, the term of this patent is extended or adjusted under 35 U.S.C. 154(b) by 66 days.

(21) Appl. No.: 16/214,823

(22) Filed: Dec. 10, 2018

(65) Prior Publication Data
US 2019/0180615 A1    Jun. 13, 2019

(30) Foreign Application Priority Data

Dec. 11, 2017 (CH) .......................................... 01501
Oct. 23, 2018 (EP) .................................... 18405020

(51) Int. Cl.
| | |
|---|---|
| *G08G 1/08* | (2006.01) |
| *G08G 1/01* | (2006.01) |
| *G08G 1/095* | (2006.01) |
| *G01C 21/00* | (2006.01) |
| *G01C 21/34* | (2006.01) |
| *G08G 1/07* | (2006.01) |

(52) U.S. Cl.
CPC ............... *G08G 1/08* (2013.01); *G01C 21/00* (2013.01); *G01C 21/3415* (2013.01);
(Continued)

(58) Field of Classification Search
CPC ............ G08G 1/08; G08G 1/095; G08G 1/07; G08G 1/0112; G08G 1/0145; G01C 21/00; G01C 21/3415; G16Z 99/00; G06Q 50/30
(Continued)

(56) References Cited

U.S. PATENT DOCUMENTS

| | | |
|---|---|---|
| 9,129,525 B2 | 9/2015 | Frish et al. |
| 2015/0248638 A1 | 9/2015 | Hergarten |

(Continued)

FOREIGN PATENT DOCUMENTS

| | | | |
|---|---|---|---|
| DE | 102008063377 A1 | 7/2010 | |
| DE | 102011107881 A1 * | 1/2013 | ............. G08G 1/087 |
| WO | 2017164914 A1 | 9/2017 | |

OTHER PUBLICATIONS

European Search Report issued in corresponding European Patent Application No. 18405020.1, dated Apr. 29, 2019.
(Continued)

*Primary Examiner* — Brian P Sweeney
(74) *Attorney, Agent, or Firm* — MKG, LLC

(57) ABSTRACT

A system and a method for reducing delays in road traffic is presented. The system and the method for reducing delays in road traffic, comprises a number of controllable traffic lights, at least one computer system for controlling the traffic lights, and at least one navigation system located in a vehicle and communicatively linked to the at least one computer system. The at least one navigation system is designed to transmit route data pertaining to the routes used to the at least one computer system. The computer system is designed to calculate vehicle arrival times at the controllable traffic lights, and additionally is designed to transmit request data based on the arrival times to the controllable traffic lights. The controllable traffic lights are switched under consideration of the request data to positively influence vehicle journey times and/or routes.

22 Claims, 5 Drawing Sheets

(52) U.S. Cl.
CPC ......... *G08G 1/0112* (2013.01); *G08G 1/0145*
(2013.01); *G08G 1/07* (2013.01); *G08G 1/095*
(2013.01)

(58) Field of Classification Search
USPC .......................................................... 701/117
See application file for complete search history.

(56) References Cited

U.S. PATENT DOCUMENTS

| | | | |
|---|---|---|---|
| 2016/0047646 A1 | 2/2016 | Ochsendorf et al. | |
| 2018/0293884 A1* | 10/2018 | Liu | G08G 1/0145 |
| 2019/0206244 A1* | 7/2019 | Takahashi | G08G 1/081 |

OTHER PUBLICATIONS

"Madrid City Council choose Kapsch on intelligent mobility solution"; ITS International; www.itsinternational.com/categories/utc/news/madrid-city-council-chooses-kapsch-on-intelligent-mobility-solution/; accessed on Feb. 4, 2019, 1 pg.
"Kapsch TrafficCom: 'The city is not made for cars'"; Its International; www.itsinternational.com/categories/utc/features/kapsch-trafficcom-the-city-is-not-made-for-cars/; accessed on Feb. 4, 2019, 4 pp.
www.kapsch.net/ktc/Portfolio/Intelligent-Mobility-Solutions/Traffic-Management/EcoTrafix-for-Cities; accessed on Feb. 4, 2019; 4 pp.
Extended European Search Report issued in correspondence European Patent Application No. 18405021.9, dated Jun. 14, 2019.

\* cited by examiner

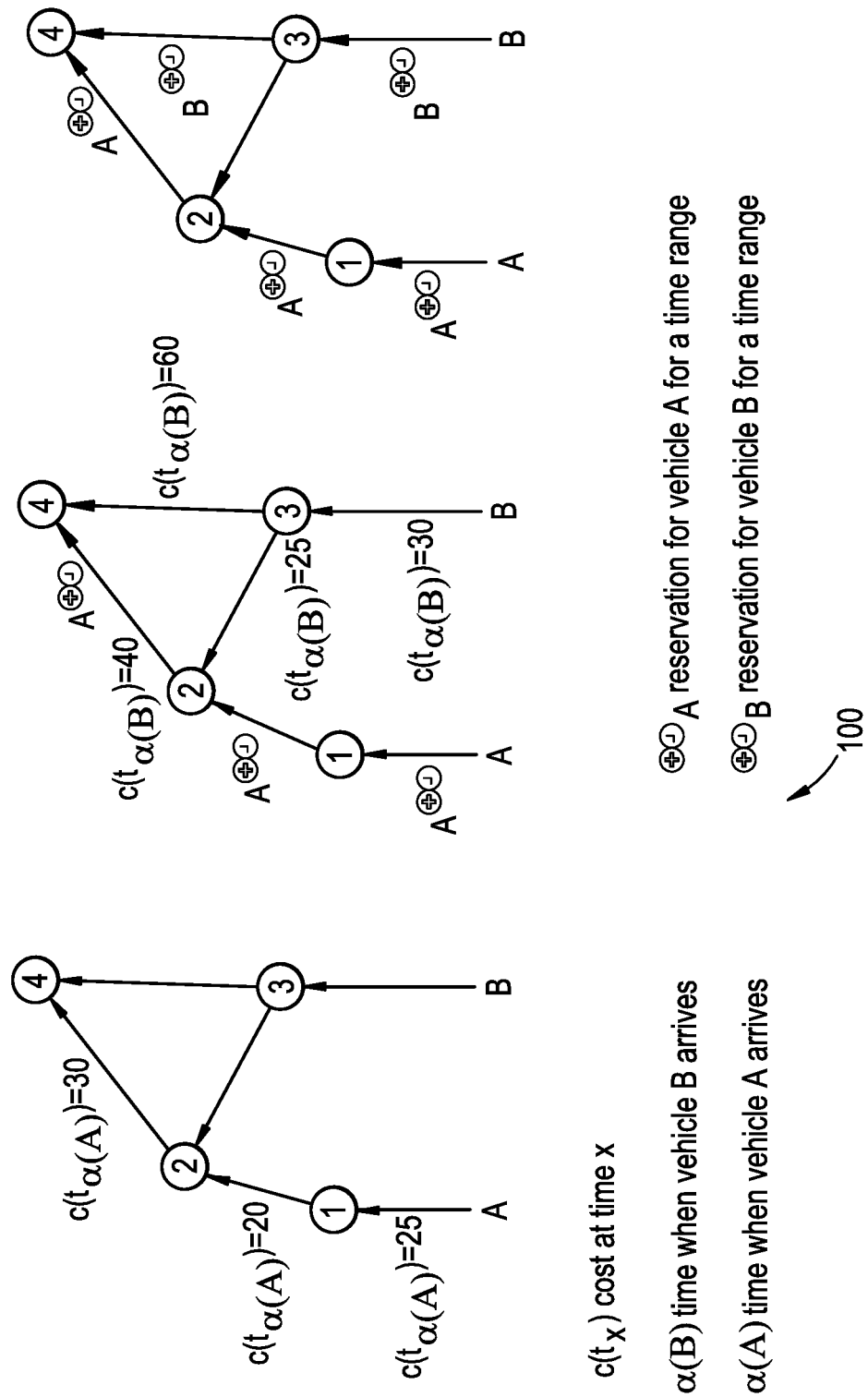

SYSTEM AND METHOD FOR REDUCING DELAYS IN ROAD TRAFFIC

CROSS-REFERENCE TO RELATED APPLICATIONS

This patent application claims priority to Swiss Patent Application No. 01501/17, filed on Dec. 11, 2017, and European Patent Application No. 18405020.1, filed on Oct. 23, 2018. The disclosures of these patent documents are incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to a system and a method for reducing delays in road traffic. In particular, the present invention is directed to systems and methods providing dynamic routing of one or more vehicles by taking into account and influencing switching systems of one or more controllable traffic lights to positively direct a journey's travel times and/or routes.

2. Description of Related Art

This description of related art is provided to generally present the context of the present invention. Unless otherwise indicated, the information described in this section are not prior art to the claimed invention of this patent document, and are not admitted to be prior art by inclusion therein.

Generally speaking, methods by which vehicle navigation systems collect information from traffic-light switching systems are generally known in the art. In conventional cases, a navigation system typically receives information pertaining to traffic-light signals in the immediate vicinity and further along a planned route. The navigation system uses this information to calculate the vehicle's estimated time of arrival at a destination, and in some embodiments, takes delays at the traffic lights along the planned route into account.

A perceived deficiency in the conventional systems and methods is that aside from estimated times of arrival and suggested routes, no solutions are provided that actively influence or direct a journey's times and/or routes. Accordingly, at least one aim of the present invention is to provide improved systems and methods that positively influence vehicle journey times and/or routes.

SUMMARY OF THE INVENTION

The present invention resides in a system and a method as set forth in the independent claims, with embodiments described in the dependent claims.

In one aspect of the present invention, a system for reducing delays in road traffic is provided. The system includes a number of controllable traffic lights, at least one computer system for controlling the traffic lights, and at least one navigation system located in a vehicle and communicatively linked to, connected with, the at least one computer system. The at least one navigation system is designed, e.g., adapted or configured, to transmit at least one of route data pertaining to driving routes and a current location of the navigation system to the at least one computer system. The at least one computer system is designed, e.g., adapted or configured, to calculate vehicle arrival times at the controllable traffic lights. In one embodiment, the at least one computer system is additionally designed, e.g., adapted or configured, to transmit request data based on the arrival times to the controllable traffic lights and the controllable traffic lights are optimally switched under consideration of the request data. In one embodiment, the controllable traffic lights are optimally switched under consideration of the request data to positively influence vehicle journey times and/or routes of the vehicle.

In one embodiment, the system for reducing delays in road traffic includes the computer system being designed, e.g., adapted or configured, to calculate request data such as to give priority to a majority of a number of vehicles, for example, where the computer system receives route data from two or more navigation systems in two or more vehicles, the majority is a maximum number of vehicles traveling driving routes in a non-intersecting direction when arriving at a specified controllable traffic light. In one embodiment, the controllable traffic lights are designed, e.g., adapted or configured, to switch under consideration of the calculated request data for the purpose of an optimized throughput of vehicles along the driving routes.

In one embodiment, the system for reducing delays in road traffic includes the computer system being a central traffic-light switching system.

In another aspect, the present invention includes a navigation system for use in the aforementioned system for reducing delays in road traffic.

In still another aspect, the present invention includes controllable traffic lights for use in the aforementioned system for reducing delays in road traffic.

In yet another aspect of the present invention, a method for reducing delays in road traffic is provided. The method includes steps of: transmission of at least one of route data and information pertaining to driving routes, way points or intermediate destinations between an origin and a final destination, and a current location from at least one navigation system in a vehicle to at least one computer system; and calculation in the at least one computer system of arrival times of the vehicle at controllable traffic lights. The method further includes steps of: transmission of request data from the at least one computer system to the controllable traffic lights on the basis of arrival times; and switching of the controllable traffic lights under consideration of the request data.

In one embodiment, the method for reducing delays in road traffic further includes: wherein the step of transmission of the at least route data and information, and current location, includes transmission of the at least one route data and information, and current location from a multiplicity of navigation systems in a multiplicity of vehicles to the at least one computer system; and wherein the calculation step includes calculation in the at least one computer system of the arrival times of the multiplicity of vehicles, and calculation in the at least one computer system of the request data such as to give priority to a majority of the vehicles, wherein the majority is a maximum number of multiplicity of vehicles traveling driving routes in a non-intersecting direction when arriving at a specified controllable traffic light; and wherein the step of switching of the controllable traffic lights is under consideration of the calculated request data for the purpose of an optimized throughput of vehicles along driving routes. In one embodiment, the controllable traffic lights are switched under consideration of the calculated request data for the purpose of an optimized throughput of the multiplicity of vehicles along the driving routes.

In another embodiment, the method for reducing delays in road traffic further includes: calculation of new vehicle route data under consideration of the switching signals of controllable traffic lights along the routes corresponding to the route data received from the multiplicity of navigation systems, and transmission of new route data to the multiplicity of navigation systems as proposed updated routes.

In still another embodiment, the method for reducing delays in road traffic further includes a step of: determination, in the at least one computer system, of arrival times of other vehicles, which do not have the navigation systems, or the navigation systems of the vehicles that have the systems are not operating, at the controllable traffic lights on the basis of probabilities in line with the calculated multiplicity of vehicles.

In another aspect, the present invention includes a computer system for the processing of data by the aforementioned method for reducing delays in road traffic.

BRIEF DESCRIPTION OF THE DRAWINGS

The features and advantages of the present invention will be better understood when the Detailed Description of the Preferred Embodiments given below is considered in conjunction with the figures provided, wherein:

FIG. 6 illustrates operation of collaborative routing embodied within and executed by algorithms, routines and methods of the system for reducing delays in road traffic of FIG. 1, in accordance with one embodiment of the present invention.

In these figures, like structures are assigned like reference numerals, but may not be referenced in the description for all figures.

DETAILED DESCRIPTION OF PREFERRED EMBODIMENTS

Figure 1:
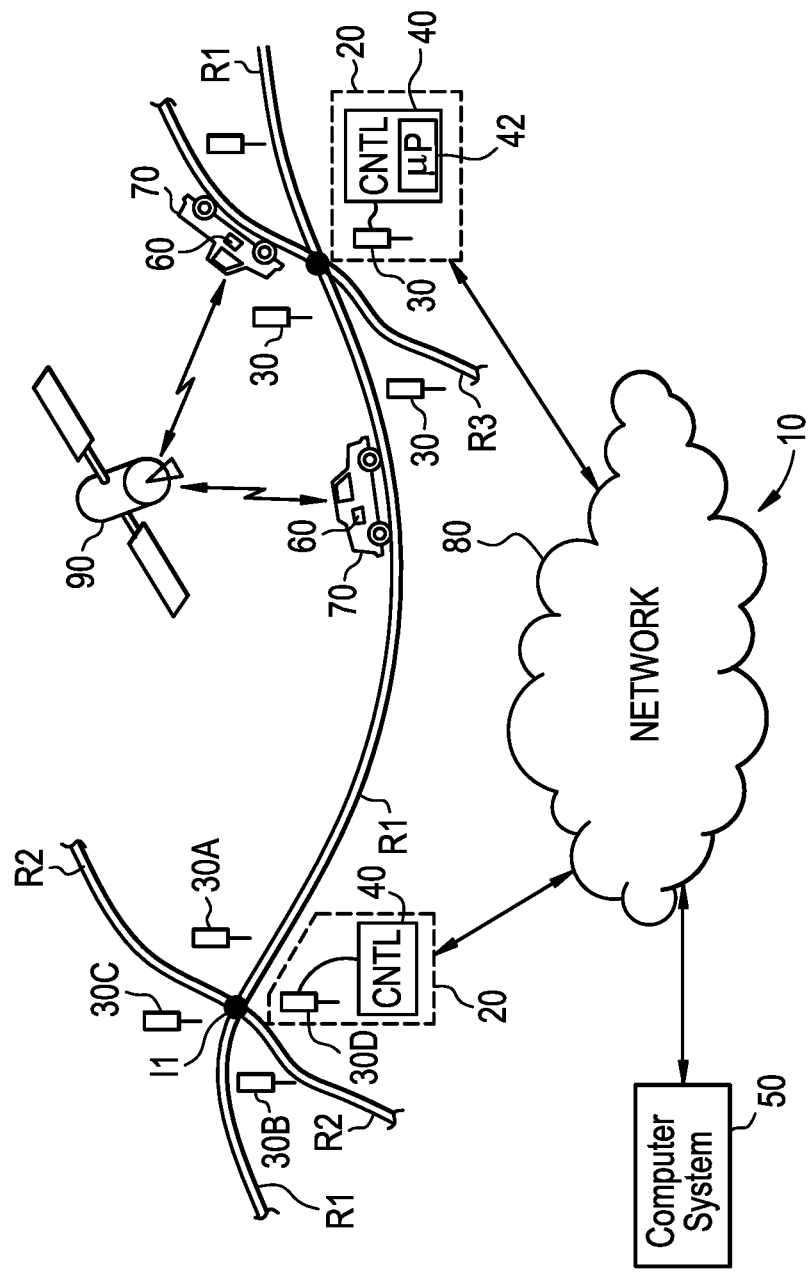
FIG. 1 is a simplified schematic diagram illustrating a configuration of a system for reducing delays in road traffic, in accordance with one embodiment of the present invention.
Figure 2:
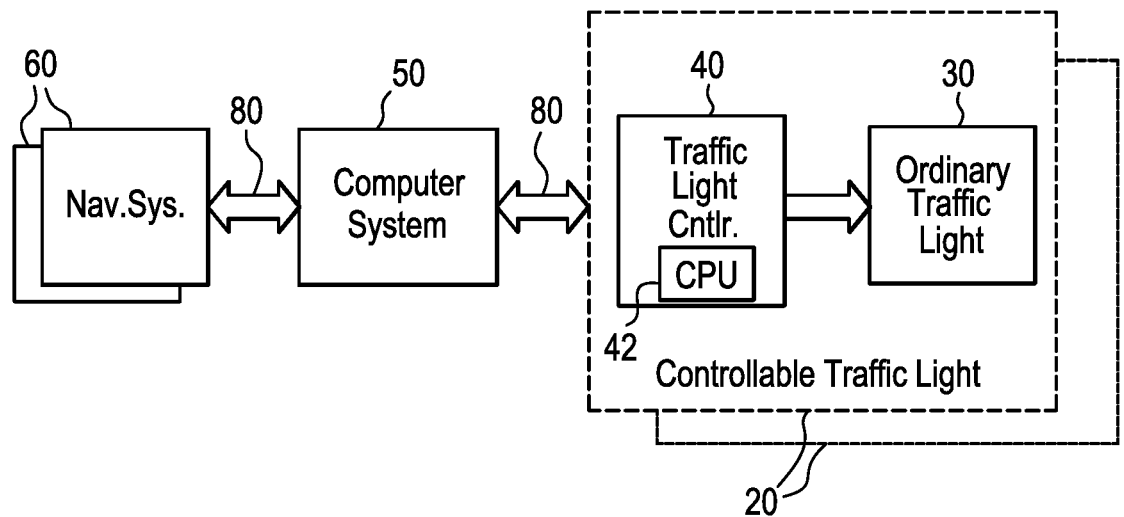
FIG. 2 is a simplified schematic block diagram illustrating functional components of the system for reducing delays in road traffic of FIG. 1, in accordance with one embodiment of the present invention.

The present invention is described below by way of one or more example embodiments and by referring to the drawing. FIGS. 1 and 2 illustrate simplified schematic diagrams of a system 10 for reducing delays in road traffic. The system 10 includes a controllable traffic light 20 comprising an ordinary traffic light 30 and a programmed traffic-light controller 40. The controllable traffic light 20 is communicatively linked to, or connected with, at least one computer system 50. The system 10 also includes at least one navigation system 60, which is also communicatively linked to the computer system 50.

Figure 3:
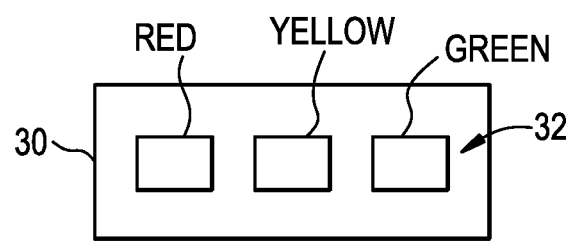
FIG. 3 is a simplified schematic block diagram illustrating functional components of a conventional, ordinary traffic light employed within the system for reducing delays in road traffic of FIG. 1, in accordance with one embodiment of the present invention.

As shown in FIG. 1, the controllable traffic light 20 comprises the ordinary traffic light 30 and, connected thereto, the programmed traffic-light controller 40. The programmed traffic-light controller 40 serves to control traffic signals 32 shown by the traffic light 30 and usually comprises one or more processors 42. As is generally known, corresponding matched pairs of conventional traffic lights, such as the aforementioned ordinary traffic light 30, are disposed at an intersection between two or more roadways and the like, and alternately signal a right of way in travel through the intersection in the roadways. For example, as shown in FIG. 1, a first pair 30A and 30B of the ordinary traffic lights 30 are located at an intersection I1 between roadways R1 and R2 to regulate traffic through the intersection I1 on roadway R1, and a second pair 30C and 30D of the ordinary traffic lights 30 are located at the intersection I1 to regulate traffic through the intersection I1 on roadway R2. As is known and illustrated in FIG. 3, conventional, ordinary traffic lights 30 regulate traffic by the traffic signals 32 comprising a display of lights within a standard color palette. One standard color palette includes, for example, a "red" color signal indicating that traffic is prohibited from proceeding through the intersection, a "green" color signal indicating that traffic is permitted to proceed through the intersection, and an "amber" or "yellow" color signal warning that the traffic light is about to change to the "red" color signal to prohibit travel through the intersection. It should be appreciated that the present invention is not limited to any particular implementation of a color palette or orientation (e.g., a vertical or a horizontal orientation) of the traffic signals 32.

The controllable traffic light 20 is operatively or communicatively linked to, or connected with, the at least one computer system 50 via a communication network 80 such as, for example, a wireless data communication network, this being represented diagrammatically in FIG. 2 by a line. The computer system 50, in turn, is operatively or communicatively linked to, or connected with, the communication network 80 such as, for example, a wireless data communication network, to one or to a multiplicity of the navigation systems 60. In one embodiment, the multiplicity of the navigation systems 60 includes a navigation system 60 that is permanently installed in a vehicle 70, a mobile navigation system 60, or a mobile terminal such as, for example, a portable computing device (laptop, notebook, tablet, PDA, mobile radiotelephone, or the like processing device) on which navigation software 60A is installed and executes algorithms in accordance with the present invention.

Figure 4:
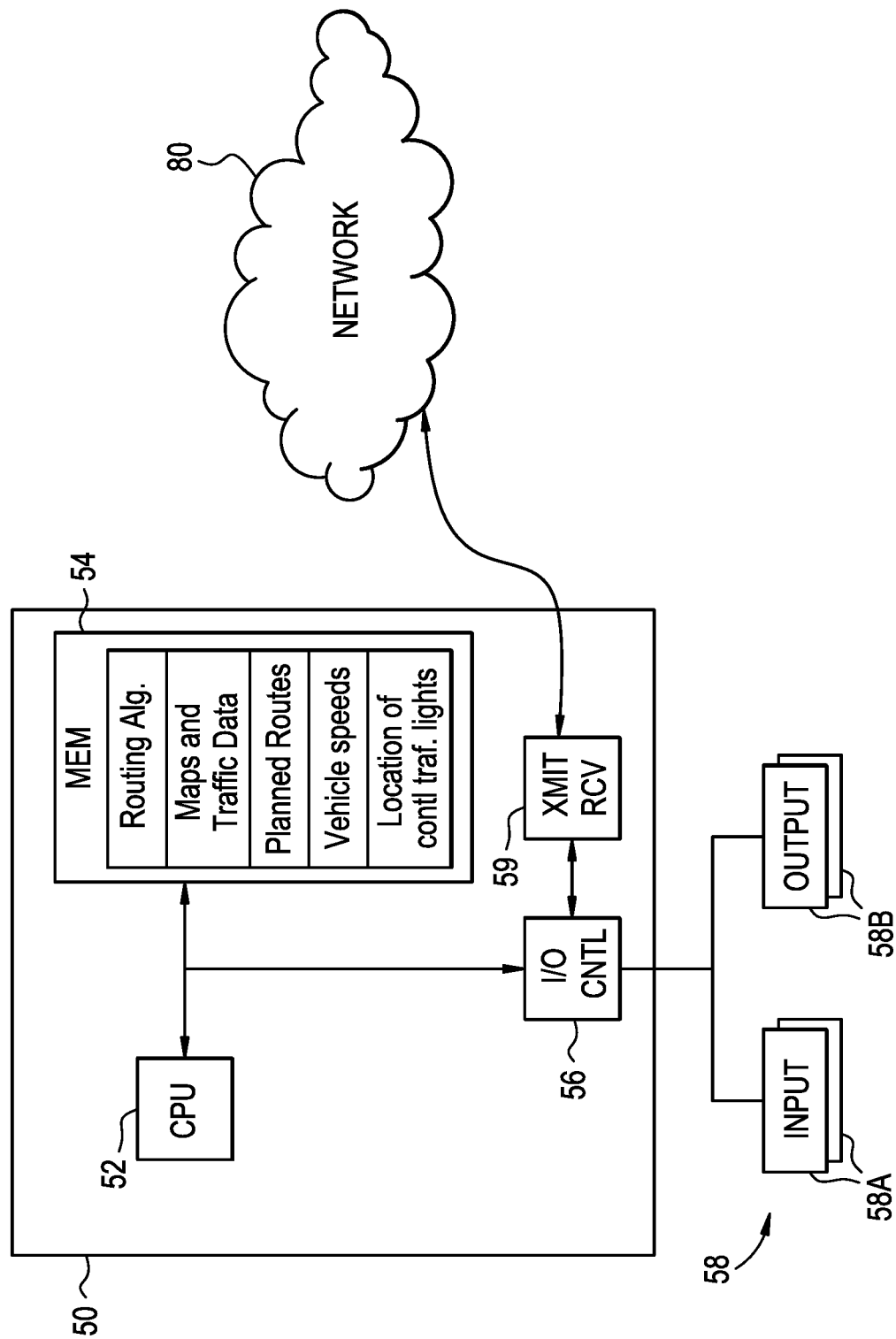
FIG. 4 is a simplified schematic block diagram illustrating hardware components of a computer system configured and operating to execute algorithms, routines and methods of the system for reducing delays in road traffic of FIG. 1, in accordance with one embodiment of the present invention.

As illustrated in FIG. 4, the computer system 50 and, in some embodiments, the navigation system 60, are provided with a similar hardware configuration, and are configured and operate in accordance with one embodiment of the present invention to implement techniques, as described herein, for collecting, storing, computing, displaying and distributing vehicle location, locations of controllable traffic lights 20 including the ordinary traffic light 30 and the programmed traffic-light controller 40, data and information on roadways, e.g., roadways R1, R2, and closures or congestion thereof, and the like. As shown in FIG. 4, the computer system 50 includes a processor such as a microprocessor or CPU 52, computer-readable storage medium or memory MEM 54, an input-output controller 56 operatively coupled to input and output devices, shown generally at 58, including input devices 58A for facilitating input of data and information to the computer system 50 such as a keyboard, a mouse, touch screen, or other input device, and output devices 58B for displaying inputted and/or processed data and other information such as a pixel-oriented display device, printer or the like. In one embodiment, the computer system 50 includes a transceiver 59 operatively or communicatively linked to, connected with, or coupled to, the communications network 80 such as the Internet, an intranet, an extranet, or like distributed communication platform for accessing and/or sending and receiving data, information, requests, commands, and otherwise communicating with one or more external devices such as, for example, the controllable traffic lights 20, and one or more of the navigation system 60 located in one or more of the vehicles 70, over wired and wireless communication connections. In one embodiment, the computer system 50 comprises at least one router or similar networking device that manages (e.g., sends and receives in a controlled manner) data and information in data packets or the like over the communication network 80. As noted above, it should be appreciated that the navigation system 60 includes a similar hardware configuration (e.g., the CPU, memory, input-output controller, input and output devices, and transceiver) as illustrated in FIG. 4.

Figure 5:
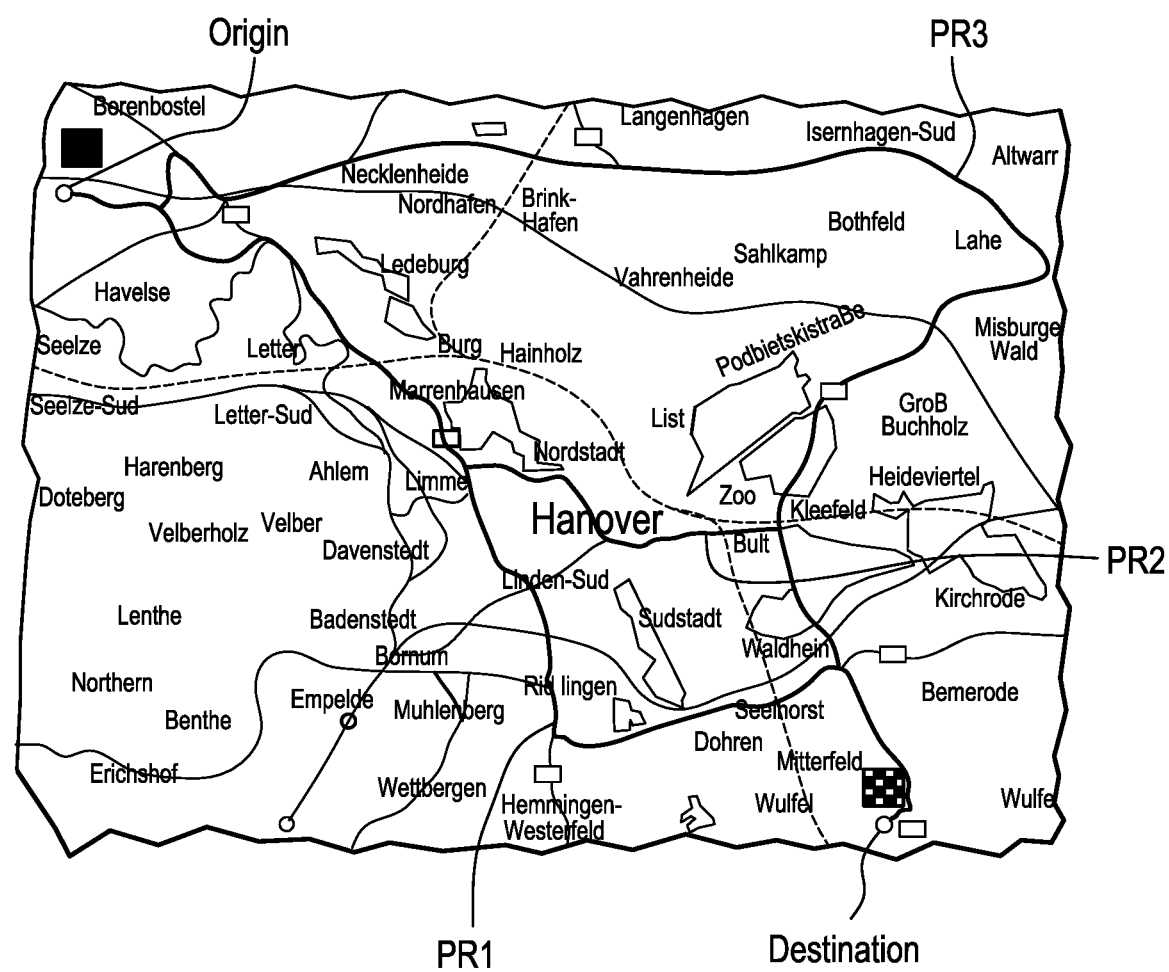
FIG. 5 illustrates a map highlighting planned routes determined by executing algorithms, routines and methods of the system for reducing delays in road traffic of FIG. 1, in accordance with one embodiment of the present invention.

During a journey, the navigation system 60 transmits information pertaining to at least one of a planned route(s) PR of the vehicle 70, for example, planned routes PR1, PR2, PR3 from an origin to a destination as illustrated in FIG. 5, and the current location of the vehicle 70 to the computer system 50 via a transmitting means and a mobile radio network (e.g., the transceiver 59 over the communications network 80). The computer system 50 compares this planned route PR information with information pertaining to controllable traffic lights 20 located along the planned routes PR that are stored in memory MEM 54 of the computer system 50. The computer system 50 is designed, e.g., adapted or configured, to calculate arrival times of the vehicle 70 at the controllable traffic lights 20. To this end, the computer system 50 uses location and/or position data from, for example, a network of global positioning satellites (GPS) 90, to calculate a current location of the vehicle 70 and calculates the speed of the vehicle 70 therefrom. The computer system 50 additionally transmits request data to the controllable traffic lights 20 to, for example, influence the signals 32 of the traffic lights 30. If, for example, the computer system 50 establishes that the vehicle 70 will arrive in three (3) minutes at a given traffic light 30, the computer system 50 transmits a request for a "green" light signal 32 in three minutes' time at the controllable traffic light 20. The programmed traffic-light controller 40 for the traffic light 30 assesses the request from the computer system 50 and determines whether a "green" light signal 32 should then be shown at the traffic light 30.

One of the criteria for assessing the request is the generation of an optimized vehicle throughput along the roadways R1, R2, R3. To this end, a multiplicity of navigation systems 60 transmits request data to the computer system 50, which in turn transmits requests to a multiplicity of traffic-light controllers 40 in an extensive area. If, for example, ten (10) vehicles 70 travelling on a first roadway (e.g., roadway R1 of FIG. 1) are expected at a traffic light 30 within a time frame of one (1) minute and only two (2) vehicles 70 travelling on a second, intersecting roadway to the first roadway (e.g., roadway R2 intersecting roadway R1 at intersection I1), are expected within the same time frame, priority is given to the request from the ten (10) vehicles 70 (e.g., priority is given to the majority of the vehicles 70) and the traffic-light controller 40 gives the vehicles 70 on the first roadway (e.g., roadway R1) a "green" light signal 32 on traffic lights 30A and 30B to proceed through the intersection I1 and gives the vehicles 70 on the second roadway (e.g., roadway R2) a "red" light signal 32 on the traffic lights 30C and 30D to stop at the intersection I1. These measures speed up the traffic flow considerably, shortening "red" light phases (e.g. wait times) at traffic lights 30 for the traffic when viewed as a whole and thereby reducing delays for vehicles 70 at controllable traffic lights 20. For example, the traffic lights 30 on a major road with a high traffic volume may not switch to a "red" light signal until the number of vehicles 70 in the intersecting side roads, calculated on the basis of request data, reaches a predetermined reference value, thereby speeding up the traffic flow along the major road and, in turn, reducing the overall delay for the sum of the vehicles 70.

A further example of the present invention relates to the determination, in the at least one computer system 50, of arrival times of other vehicles at the controllable traffic lights 20 on the basis of probabilities in line with the calculated multiplicity of vehicles. This example relates to instances in which not all vehicles have navigation systems 60, or the navigation systems 60 of vehicles 70 that have the systems 60 are not operating, and do not transmit request data to the computer system 50. As described, the controllable traffic lights 20 in the system 10 under consideration receive requests from the computer system 50. The computer system 50 additionally uses stored information to calculate the probable arrival times of the other vehicles, which do not transmit any request data, at the controllable traffic lights 20. The other vehicles, too, are thus taken into account in connection with reducing delays. If approximately sixty percent (60%) of vehicles are equipped with navigation systems 60 that transmit request data as described, while the other vehicles do not, these forty percent (40%) of vehicles will also be taken into account with this kind of dynamic routing. For example, the driving routes that are known to the computer system 50 because they have been communicated to it can be used to draw conclusions as to the speeds of other vehicles and the routes they are using since it may be assumed that these will be similar or the same as the routes and arrival times of vehicles that transmit request data.

In still another example of the present invention, the at least one computer system 50 provides proposals or recommendations for adjustments, modifications or updates to planned routes PR being travelled by one or more of the vehicles 70. In one embodiment, the adjustments, modifications or updates are different, varying and, at times unique, to one or more of the vehicles 70, to influence or control the number of vehicles 70 travelling along one or more of the planned routes PR. In this manner, the computer system 50 may regulate and manage the number of vehicles on any one or more of the planned routes PR to improve traffic flow.

In one embodiment, a collaborative routing method 100 is stored in MEM 54 and executed by the CPU 52 of the computer system 50 when making the aforementioned adjustments, modifications or updates to one or more of the planned routes PR for one or more vehicles 70. As illustrated in FIG. 6, in this embodiment of the present invention the collaborative routing method 100 predicts a cost ($c(t_x)$) at a particular point x in time t for a vehicle A or B to travel one or more segments of a planned route. The cost ($c(t_x)$) is updated dynamically in real-time for every road segment and for every junction, way point or intermediate destination 1, 2, 3 and 4, using for example, demand and raw traffic data. In one embodiment, when the method 100 assigns a route to a vehicle, it reserves capacity (e.g., makes a "reservation") for that vehicle based on where the vehicle will be located and at what time. For example, as illustrated in FIG. 6, when a route is assigned to vehicle A, e.g., through junctions 1, 2 to 4, vehicle B will see an updated future cost for all road segments that includes the reservations for vehicle A at various points. Accordingly, the route for vehicle B is calculated by taking into account the reservation for vehicle A, e.g., noting an increased cost through junction 2 to 4 (30 for vehicle A is now 40 for vehicle B), even before vehicle A gets to junction 2. If vehicle B had been the first to request a route, vehicle B would have been assigned the route through junctions 3, 2 to 4. However, since vehicle A has been given the reservation, the cost for vehicle B through junction 2 to 4 has increased in the time interval since vehicle A is predicted to be traveling on the segment, such that vehicle B is assigned a route through junction 3 to 4 at a lesser cost (60 as compared to 65).

Although described in the context of preferred embodiments, it should be realized that a number of modifications to these teachings may occur to one skilled in the art. By example, the teachings of the present invention are not intended to be limited to vehicles of any particular type, that is, the present invention is not intended to be utilized by only personal, passenger vehicles or commercial delivery vehicles, as any vehicles can benefit from the described systems and methods that provide dynamic routing of one or more vehicles by taking into account and influencing switching systems of one or more controllable traffic lights to positively direct a journey's travel times and/or routes. While the invention has been particularly shown and described with respect to preferred embodiments thereof, it will be understood by those skilled in the art that changes in form and details may be made therein without departing from the scope and spirit of the invention.

LIST OF REFERENCE SIGNS

10 System for reducing delays in road traffic
20 Controllable traffic light
30 Ordinary traffic light
   32 Traffic signals
40 Programmed traffic-light controller
   42 Processor or CPU
50 Computer system
   52 Processor or CPU
   54 Memory MEM 54
   56 Input-output controller
   58 Input devices 58A and output devices 58B
   59 Transceiver
   Router
60 One or a multiplicity of navigation systems
70 Vehicle(s), and A and B of FIG. 6
80 Communications network
90 GPS
100 Collaborative routing method
PR Planned Route(s), and PR1, PR2, PR3 of FIG. 5
R Roadway, and R1, R2 and R3 of FIG. 1
   I1 Intersection between Roadway R1 and R2

What is claimed is:

1. A system for reducing delays in road traffic, the system comprising:
a plurality of controllable traffic lights;
at least one computer system operatively coupled to and configured to control the plurality of controllable traffic lights; and
at least one navigation system located in a vehicle, the at least one navigation system communicatively linked to the at least one computer system, wherein the at least one navigation system is configured to transmit a planned driving route of the vehicle and a current location of the vehicle to the at least one computer system;
wherein the at least one computer system is configured to calculate arrival times of the vehicle at one or more of the plurality of controllable traffic lights, and the at least one computer system is also configured to transmit request data based on the arrival times at the controllable traffic lights such that the controllable traffic lights are switched under consideration of the request data; and
wherein the at least one computer system is configured to transmit to the navigation system at least one of a proposal and recommendation for adjustments, modifications or updates to the planned driving route of the vehicle.

2. The system of claim 1, wherein the computer system is a central traffic-light switching system.

3. The system of claim 1, wherein the at least one navigation system located in a vehicle includes at least one navigation system located in each of a plurality of vehicles, each of the at least one navigation system communicatively linked to the at least one computer system, wherein each of the at least one navigation system is configured to transmit a planned driving route of the respective vehicle and a current location of the respective vehicle to the at least one computer system;
wherein the at least one computer system is configured to calculate arrival times of each of the plurality of vehicles at one or more of the plurality of controllable traffic lights, and the at least one computer system is also configured to transmit request data based on the arrival times at the controllable traffic lights such that the controllable traffic lights are switched under consideration of the request data; and
wherein the at least one computer system is configured to provide to the at least one navigation system of each of the plurality of vehicles at least one of a proposal and recommendation for adjustments, modifications or updates to the planned driving route of the vehicle.

4. The system of claim 3, wherein the at least one computer system is configured to calculate request data such as to give priority to a majority of the plurality of vehicles arriving at a specified controllable traffic light, and that the specified controllable traffic light is configured to switch under consideration of the calculated request data.

5. The system of claim 3, wherein the at least one computer system is configured to calculate request data such as to give priority to the plurality of vehicles traveling on a first road arriving at a specified controllable traffic light at an intersection with a second road having traffic volume less than traffic volume of the first road, and that the specified controllable traffic light is configured to switch under consideration of the calculated request data.

6. The system of claim 3, wherein the at least one computer system is configured to calculate request data such as to give priority to the plurality of vehicles traveling on a first road arriving at a specified controllable traffic light at an intersection with a second road having traffic volume less than traffic volume of the first road until a predetermined number of the plurality of vehicles traveling on the second road arrives at the specified controllable traffic light, and that the specified controllable traffic light is configured to switch under consideration of the calculated request data.

7. The system of claim 3, wherein the adjustments, modifications or updates to the planned driving route of the vehicle transmitted to the at least one navigation system of at least of the plurality of vehicles regulates a number of vehicles on any one or more of the planned driving routes.

8. The system of claim 3, wherein the at least one computer system is configured to calculate arrival times of a percentage of vehicles not communicating with the at least one computer system based on the calculated arrival times of the plurality of vehicles communicating with the at least one computer system, and the at least one computer system is also configured to transmit request data based on the arrival times at the controllable traffic lights of the plurality of vehicles that are communicating and not communicating with the at least one computer system such that the controllable traffic lights are switched under consideration of the request data.

9. The system of claim 3, wherein the at least one computer system reserves a planned driving route of each of the plurality of vehicles based on a reservation request transmitted to the at least one computer system by the at least one navigation system of each of the plurality of vehicles; and
    wherein the at least one computer system is configured to calculate request data such as to give priority to one vehicle over other vehicles arriving together at a specified controllable traffic light at an intersection that has an earlier reservation request than the other vehicles, and that the specified controllable traffic light is configured to switch under consideration of the calculated request data.

10. The system of claim 9, wherein the at least one computer system transmit at least one of a proposal and recommendation for adjustments, modifications or updates to the planned driving route to at least one of the navigation systems of the at least one of the other vehicles that did not have priority over the vehicle having an earlier reservation request at the specified controllable traffic light.

11. The system of claim 1, wherein the planned driving route includes way points or intermediate destinations between an origin and a destination.

12. A method for reducing delays in road traffic, the method comprising:
    transmitting a planned driving route and current location data from at least one navigation system in a vehicle to at least one computer system;
    calculating, by the at least one computer system, arrival times of the vehicle at one or more controllable traffic lights;
    transmitting of request data from the at least one computer system to the one or more controllable traffic lights on the basis of the arrival times;
    switching of the controllable traffic lights under consideration of the request data; and
    transmitting to the at least one navigation system at least one of a proposal and recommendation for adjustments, modifications or updates to the planned driving route of the vehicle.

13. The method of claim 12,
    wherein the transmitting of the planned driving route and the current location data from the at least one navigation system further includes transmitting a planned driving route and current location data from at least one navigation system located in each of a plurality of vehicles to the at least one computer system;
    wherein the calculating in the at least one computer system of the arrival times further includes calculating arrival times of each of the plurality of vehicles at a specified one of the controllable traffic lights;
    wherein the calculation by the at least one computer system of the request data such as to give priority to a majority of the plurality of vehicles arriving at the specified controllable traffic light; and
    wherein the switching of the controllable traffic lights further includes taking under consideration the calculated request data.

14. The method of claim 12,
    wherein the transmitting of the planned driving route and the current location data from the at least one navigation system further includes transmitting a planned driving route and current location data from at least one navigation system located in each of a plurality of vehicles to the at least one computer system;
    wherein the calculating in the at least one computer system of the arrival times further includes calculating arrival times of each of the plurality of vehicles at a specified one of the controllable traffic lights; and
    wherein the switching of the controllable traffic lights further includes taking under consideration the calculated request data.

15. The method of claim 14, further including:
calculating arrival times of a percentage of vehicles not communicating with the at least one computer system based on the calculated arrival times of the plurality of vehicles communicating with the at least one computer system; and
transmitting request data based on the arrival times at the controllable traffic lights of the plurality of vehicles that are communicating and not communicating with the at least one computer system such that the controllable traffic lights are switched under consideration of the request data.

16. The method of claim 14, further comprising:
calculating request data such as to give priority to the plurality of vehicles traveling on a first road arriving at a specified controllable traffic light at an intersection with a second road having traffic volume less than traffic volume of the first road; and
switching the specified controllable traffic light under consideration of the calculated request data.

17. The method of claim 14, further comprising:
calculating request data such as to give priority to the plurality of vehicles traveling on a first road arriving at a specified controllable traffic light at an intersection with a second road having traffic volume less than traffic volume of the first road until a predetermined number of the plurality of vehicles traveling on the second road arrives at the specified controllable traffic light; and
switching the specified controllable traffic light under consideration of the calculated request data.

18. The method of claim 14, wherein the adjustments, modifications or updates to the planned driving route of the vehicle transmitted to the at least one navigation system of at least of the plurality of vehicles regulates a number of vehicles on any one or more of the planned driving routes.

19. The method of claim 14, further comprising:
reserving a planned driving route of each of the plurality of vehicles based on a reservation request transmitted to the at least one computer system by the at least one navigation system of each of the plurality of vehicles;
calculating request data such as to give priority to one vehicle over other vehicles arriving together at a specified controllable traffic light at an intersection that has an earlier reservation request than the other vehicles;
switching the specified controllable traffic light under consideration of the calculated request data.

20. The method of claim 19, further comprising:
transmitting at least one of a proposal and recommendation for adjustments, modifications or updates to the planned driving route to at least one of the navigation systems of the at least one of the other vehicles that did not have priority over the vehicle having an earlier reservation request at the specified controllable traffic light.

21. The method of claim 12, wherein the planned driving route includes way points or intermediate destinations between an origin and a destination.

22. A computer system for the processing of data to reducing delays in road traffic by the method comprising:
receiving a planned driving route and current location data from at least one navigation system in a vehicle;
calculating arrival times of the vehicle at one or more controllable traffic lights;
transmitting of request data to the one or more controllable traffic lights on the basis of the arrival times to switch a controllable traffic light under consideration of the request data; and
transmitting to the at least one navigation system at least one of a proposal and recommendation for adjustments, modifications or updates to the planned driving route of the vehicle.

* * * * *